United States Patent
Nemer et al.

[11] Patent Number: 5,995,252
[45] Date of Patent: Nov. 30, 1999

[54] LOW POWER DIGITAL SIGNAL ISOLATOR

[75] Inventors: Joseph C. Nemer, Mayfield Heights; Brian D. Hemphill, Painesville, both of Ohio

[73] Assignee: Elsag International N.V., Amsterdam, Netherlands

[21] Appl. No.: 08/807,996

[22] Filed: Mar. 3, 1997

[51] Int. Cl.[6] .............................. G02F 1/00; H04B 10/00
[52] U.S. Cl. ........................................... 359/109; 250/551
[58] Field of Search .......................... 359/109, 181–182, 359/184, 186–187; 250/551; 327/574

[56] References Cited

U.S. PATENT DOCUMENTS

| | | | |
|---|---|---|---|
| 3,810,034 | 5/1974 | Brunsch | 330/59 |
| 4,292,551 | 9/1981 | Kolmann | 359/109 |
| 5,434,694 | 7/1995 | Saito et al. | 359/186 |

*Primary Examiner*—Kinfe-Michael Negash
*Attorney, Agent, or Firm*—Michael M. Rickin

[57] ABSTRACT

A signal isolating device for an input digital signal has a first photo-coupler which is activated by the differential pulse produced at the leading edge of the digital signal and a second photo-coupler which is activated by the differential pulse produced at the trailing edge of the digital signal. A positive feedback system is connected in push-pull fashion with the photo-couplers for producing an output digital signal that corresponds to the input digital signal. The positive feedback system may be implemented by a buffer that includes a resistor for keeping the buffer in a stable state even when both of the photo-couplers are non-conductive.

18 Claims, 1 Drawing Sheet

LOW POWER DIGITAL SIGNAL ISOLATOR

FIELD OF THE INVENTION

This invention relates to signal isolating devices and more particularly to those devices that use photo-coupling to glavanicaly isolate a digital signal.

DESCRIPTION OF THE PRIOR ART

There are many applications where it is desirable to galvanicaly isolate a digital signal. The techniques used to provide that isolation depend, in part, on the amount of power available in the application and concerns for power consumption.

In those applications where power consumption is not a leading concern, a common technique for isolating a digital signal is to use an opto-isolator consisting of a light emitting diode (LED) and a phototransistor. This optically coupled emitter-detector pair is driven directly by the digital signal. Power consumption, is high in such an opto-isolator because the current flow through the LED typically must be at least 1 mA to thereby turn the LED on strongly enough so that the phototransistor sinks sufficient load current for the entire time the digital signal is high. Since each LED is on for an average of one-half of each cycle of the input signal, the average current would be 0.5 mA.

In practice, however, the forward current flow through the LED must be set much higher than the nominal current of 1.0 mA to give a good margin of safety. This margin is needed because the current transfer capabilities of opto-isolators are known to vary widely with time, temperature, and device to device inconsistencies. Thus, in practice the average current would be much higher than 0.5 mA.

In those applications where very little power is available, galvanic isolation of digital signals is often accomplished using pulsed transformers or capacitors. There are, however, problems with using such devices for isolation. Transformers are difficult to manufacture and expensive, particularly in surface mount packages. Capacitors used for isolation must have high voltage ratings which results in large packages for a moderate capacitance value. Surface mount capacitors with high voltage ratings are more expensive and difficult to obtain than standard capacitors.

In contrast, opto-isolators are readily and inexpensively available in surface mount packages. Therefore, it is desirable in low power consumption applications, such as line powered instrumentation, to galvanicaly isolate a digital signal using opto-isolators.

One such use of opto-isolators is described in U.S. Pat. No. 5,434,694 (the '694 Patent). The '694 Patent describes and shows in FIGS. 2, 7, 9, 11, and 15 several embodiments for a signal isolating device which uses opto-isolation. Each of the embodiments has two opto-isolators each of which comprise a LED and a phototransistor.

In all of the embodiments shown in the '694 Patent, a pulse width modulated signal is converted to pulses at the leading and the trailing edges of the pulse width modulated signal. In the embodiments shown in FIGS. 2, 7 and 15, there is a transistor connected to either the collector (FIGS. 2 and 15) or the emitter (FIG. 7) of each phototransistor. In the embodiment shown in FIG. 9, there is a comparator connected to the collector of each phototransistor. In the embodiment shown in FIG. 11, there is a switch connected to the collector of each phototransistor.

In the embodiments shown in FIGS. 2, 7 and 9, the transistors or comparators are connected to a flip-flop circuit. In the embodiment shown in FIG. 15, the transistors are connected to two switches which function as a flip-flop. The two switches of the embodiment of FIG. 11 also function as a flip-flop. The embodiments of FIGS. 11 and 15 further include a pulse width to voltage converter comprising a third switch, and an amplifier and associated components to smooth the voltage signal outputted by the third switch.

Each of the embodiments shown in the '694 Patent include different combinations of circuitry connected to the output of the phototransistors. It is desirable to have a signal isolation device which uses opto-isolation that is simpler, uses less circuitry than the embodiments shown in the '694 Patent and therefore less expensive than the embodiments shown in that patent.

SUMMARY OF THE INVENTION

A device for isolating a signal. The signal isolating device has a differential pulse outputting means for receiving a first digital signal having a predetermined period and for producing differentiated pulses at a leading edge and at a trailing edge of the first digital signal. The signal isolating device also has a first photo-coupler having a photo-transistor activated by the differentiated pulse produced at the leading edge, and a second photo-coupler having a photo-transistor activated by the differentiated pulse produced at the trailing edge. The period of time for which the first and second photo-couplers are activated is substantially less than one-half of the predetermined period of the first digital signal. The signal isolating device further has a positive feedback means connected in push-pull fashion with the first and second photo-couplers for producing a second digital signal corresponding to the first digital signal.

A method for isolating a signal. The method has the step of producing differentiated pulses at a leading edge and at a trailing edge of a first digital signal having a predetermined period. The method also has the steps of activating a first photo-coupler having a photo-transistor by the differentiated pulse produced at the leading edge, and activating a second photo-coupler having a photo-transistor by the differentiated pulse produced at the trailing edge. The period of time for which the first and second photo-couplers are activated is substantially less than one-half of the predetermined period of the first digital signal. The method further also has the step of connecting a positive feedback means in push-pull fashion with the first and second photo-couplers for producing a second digital signal corresponding to the first digital signal.

DESCRIPTION OF THE PREFERRED EMBODIMENT(S)

Figure 1:
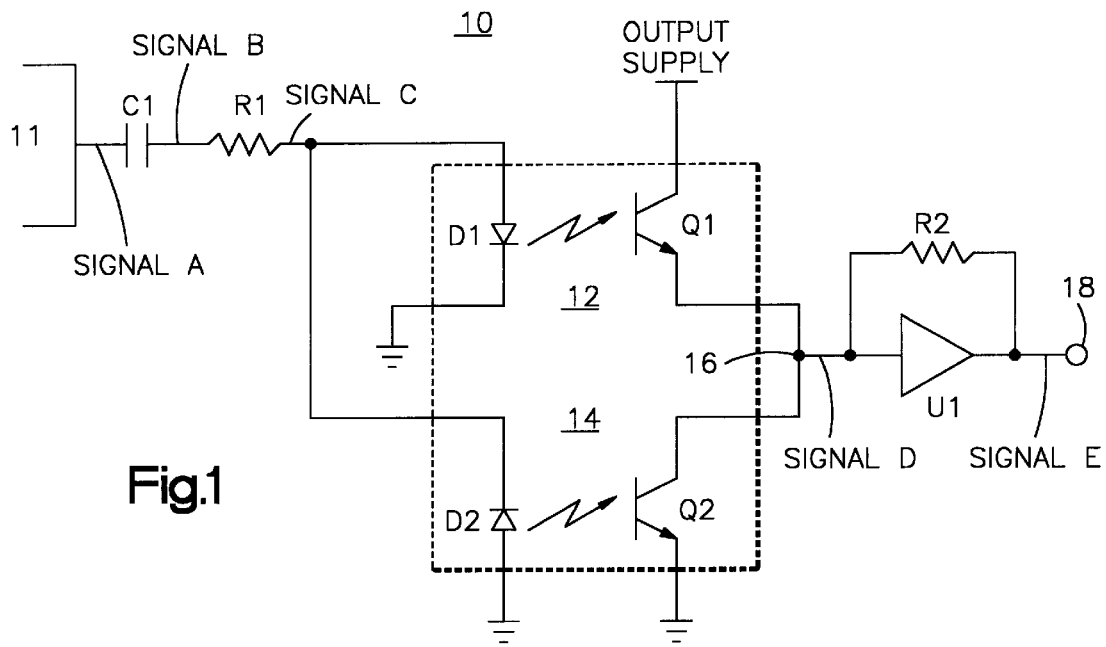
FIG. 1 shows a circuit which includes the digital signal isolation device of the present invention.
Figure 2A:
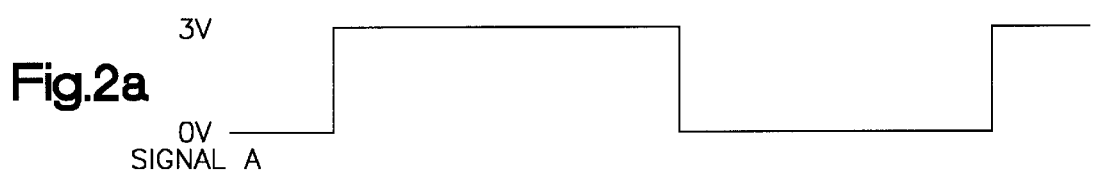
FIGS. 2a to 2e show the waveform of the signal at various locations in the circuit of FIG. 1.

Referring now to FIG. 1, there is shown circuit 10 which includes the digital signal isolation device of the present invention. The signal to input 11 of circuit 10 is a digital signal which may, for example, be either a frequency shift keyed signal (FSK) or, as is shown in FIG. 2a, a pulse width modulated (PWM) signal. In one implementation for circuit 10, the PWM signal had a period of 8.33 milliseconds, with variable duty cycle.

Figure 2B:
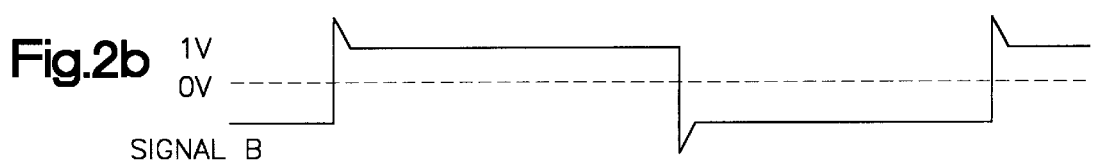
Figure 2C:
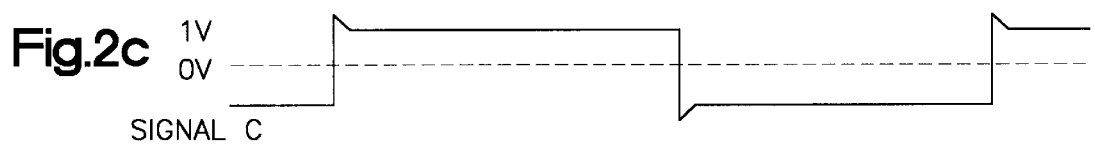

Circuit 10 includes drive capacitor C1 and drive resistor R1 which provide from the digital input signal to circuit 10, the drive signals for LED D1 of opto-isolator 12 and LED D2 of opto-isolator 14. The waveform of the signal at the output of capacitor C1 is shown in FIG. 2b and the waveform of the drive signal at the output of resistor R1 is shown in FIG. 2c.

The drive signal to the opto-isolators is such that one LED receives a pulse of current on the rising edge of the digital input signal and the other LED receives a pulse of current on the trailing edge of the digital input signal. The pulse of current turns on the associated LED. In the implementation for circuit 10 wherein the PWM signal period is 8.33 milliseconds, the capacitance of C1 and the resistance of R1 were selected so that the LEDs D1 and D2 were each turned on for 0.05 milliseconds upon the occurrence of the associated pulse of current.

Figure 2D:
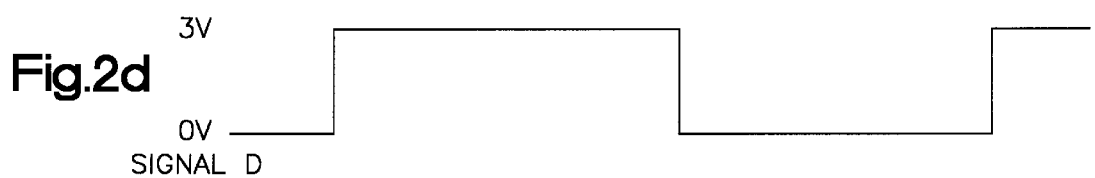

The pulse of current that turns on LED D1 also turns on phototransistor Q1 of opto-isolator 12. The pulse of current that turns on LED D2 also turns on the phototransistor Q2 of opto-isolator 14. The waveform of the signal which appears at junction 16 of the emitters of Q1 and Q2 is shown in FIG. 2d. As can be seen from a comparison of FIG. 2d with FIG. 2a, the signal at junction 16 is identical in duty cycle to the digital signal at the input to circuit 10.

Connected between junction 16 and the output 18 of circuit 10 is a non-inverting buffer U1. The phototransistors Q1 and Q2 are connected in a push-pull fashion in conjunction with buffer U1. Buffer U1 includes a feedback resistor R2 connected between the buffer's input and output.

The resistor R2 keeps buffer U1 in a stable state even when both of the opto-isolator phototransistors Q1 and Q2 are off. Therefore, only a brief on time is required for each opto-isolator to change the state of buffer U1. As described above, that brief on time occurs when a transition occurs and the length of the on time can be changed by varying the resistance of resistor R1 and the capacitance of capacitor C1.

Figure 2E:
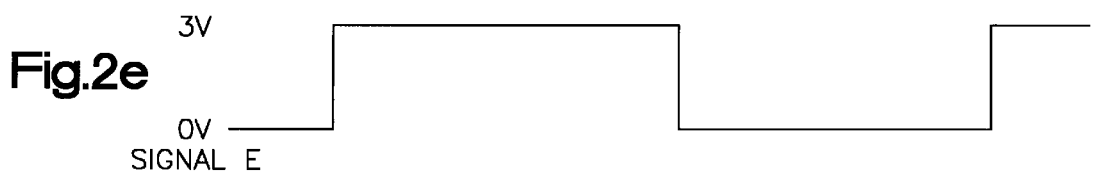

The waveform of the signal at the output of buffer U1 is shown in FIG. 2e. A comparison of FIGS. 2a and 2e shows that the signal at the output of buffer U1 is an excellent representation in duty cycle of the input signal to circuit 10.

It should be appreciated that the combination of buffer U1 and resistor R2 function as a positive feedback system. It should further be appreciated that buffer U1 may be implemented using an operational amplifier as shown in FIG. 1, or may, for example, also be implemented using a comparator, or two inverters in a row, or a digital gate configured as a buffer.

Each of the LEDs D1 and D2 when on draw one milliampere of current. In the implementation for circuit 10 wherein the duty cycle of the signal is 8.33 ms and each LED is turned on for 0.05 ms at each transition, the LEDs are on for 1.2% of each cycle of the input signal. Therefore, the average current draw will be 1.2% of one milliampere or 0.012 mA. This current draw is substantially less than the nominal 0.5 mA average current of the prior art circuit described above. Thus, the circuit of the present invention draws at least 24 times less power than the power drawn by that prior art circuit.

It should be appreciated that the pulsing of opto-isolators by the circuit of the present invention keeps the average current consumption very low while allowing sufficient LED current to quickly switch over a wide variation of time, temperature and device inconsistency. It should also be appreciated that the signal isolation circuit of the present invention can be used with any digital signal including the PWM signal described herein and communication signals.

It is to be understood that the description of the preferred embodiment is intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A device for isolating a signal comprising:
   a. a differential pulse outputting means for receiving a first digital signal having a predetermined period and for producing differentiated pulses at a leading edge and at a trailing edge of said first digital signal;
   b. a first photo-coupler having a phototransistor activated for a period of time which is substantially less than one half of said predetermined period of said first digital signal by said differentiated pulse produced at said leading edge;
   c. a second photo-coupler having a phototransistor activated for a period of time which is substantially less than one half of said predetermined period of said first digital signal by said differentiated pulse produced at said trailing edge; and
   d. a positive feedback means connected in push-pull fashion with said first and second photo-couplers for producing a second digital signal corresponding to said first digital signal.

2. The signal isolating device of claim 1 wherein said positive feedback means is a non-inverting buffer, said non-inverting buffer including means for keeping said buffer in a stable state even when both of said first and second photo-couplers are non-conductive.

3. The device of claim 2 wherein said first and said second photo-couplers each comprise a light emitting diode.

4. The signal isolating device of claim 1 wherein said digital signal is a pulse width modulated signal.

5. The signal isolating device of claim 4 wherein said positive feedback means is a non-inverting buffer, said non-inverting buffer including means for keeping said buffer in a stable state even when both of said first and second photo-couplers are non-conductive.

6. The device of claim 4 wherein said first and said second photo-couplers each comprise a light emitting diode.

7. The device of claim 4 wherein said predetermined period of said pulse width modulated signal is 8.33 milliseconds and said period of time for which said first and said second photo-couplers are each activated is 0.05 milliseconds.

8. The device of claim 5 wherein said first and said second photo-couplers each comprise a light emitting diode.

9. The device of claim 5 wherein said predetermined period of said pulse width modulated signal is 8.33 milliseconds and said period of time for which said first and said second photo-couplers are each activated is 0.05 milliseconds.

10. The device of claim 1 wherein said period of time for which said first photo-coupler is activated is no more than ten percent of said predetermined period of said first digital signal.

11. The device of claim 10 wherein said period of time for which said second photo-coupler is activated is no more than ten percent of said predetermined period of said first digital signal.

12. The device of claim 1 wherein said first and said second photo-couplers each comprise a light emitting diode.

13. A method for isolating a signal comprising the steps of:
   a. producing differentiated pulses at a leading edge and at a trailing edge of a first digital signal, said first digital signal having a predetermined period;
   b. activating a first photo-coupler having a phototransistor for a period of time which is substantially less than half said predetermined period of said first digital signal by said differentiated pulse produced at said leading edge;
   c. activating a second photo-coupler having a phototransistor for a period of time which is substantially less than half said predetermined period of said first digital signal by said differentiated pulse produced at said trailing edge; and
   d. connecting a positive feedback means in push-pull fashion with said first and second photo-couplers for producing a second digital signal corresponding to said first digital signal.

14. The method of claim 13 wherein said period of time for which said first photo-coupler is activated is no more than ten percent of said predetermined period of said first digital signal.

15. The method of claim 14 wherein said period of time for which said second photo-coupler is activated is no more than ten percent of said predetermined period of said first digital signal.

16. The method of claim 13 wherein said first and said second photo-couplers each comprise a light emitting diode.

17. The method of claim 13 wherein digital signal is a pulse width modulated signal.

18. The method of claim 17 wherein said predetermined period of said pulse width modulated signal is 8.33 milliseconds and said period of time for which said first and said second photo-couplers are each activated is 0.05 milliseconds.

* * * * *